US012687518B2

(12) United States Patent
Kudo

(10) Patent No.: US 12,687,518 B2
(45) Date of Patent: Jul. 21, 2026

(54) ANALYSIS METHOD AND ANALYSIS DEVICE

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 412 days.

(21) Appl. No.: 17/772,794

(22) PCT Filed: Nov. 12, 2019

(86) PCT No.: PCT/JP2019/044422
§ 371 (c)(1),
(2) Date: Apr. 28, 2022

(87) PCT Pub. No.: WO2021/095144
PCT Pub. Date: May 20, 2021

(65) Prior Publication Data
US 2022/0373511 A1 Nov. 24, 2022

(51) Int. Cl.
*G01N 27/62* (2021.01)
*G01N 30/62* (2006.01)
*G01N 30/86* (2006.01)

(52) U.S. Cl.
CPC ............. *G01N 27/62* (2013.01); *G01N 30/86* (2013.01); *G01N 2030/626* (2013.01)

(58) Field of Classification Search
CPC ... G01N 27/62; G01N 30/86; G01N 2030/626
See application file for complete search history.

(56) References Cited

FOREIGN PATENT DOCUMENTS

| JP | 2003-177120 A | 6/2003 |
| JP | 2009-103518 A | 5/2009 |
| JP | 2016-095253 A | 5/2016 |

OTHER PUBLICATIONS

Peter Kusch, Pyrolysis-Gas Chromatography/Mass Spectrometry of Polymeric Materials, 2003, intechopen (Year: 2003).*
Chen et al., A modified data normalization method for GC-MS-based metabolomics to minimize batch variation, 2014, Springerplus. 2014; 3: 439. (Year: 2014).*
Jean-Philippe Antignac et al., "The ion suppression phenomenon in liquid chromatography-mass spectrometry and its consequences in the field of residue analysis", Analytica Chimica Acta, 2005, pp. 129-136, vol. 529.

(Continued)

*Primary Examiner* — Maris R Kessel
*Assistant Examiner* — Mickey Huang
(74) *Attorney, Agent, or Firm* — Sughrue Mion, PLLC

(57) ABSTRACT

An analysis method of performing an analysis on a sample containing a first substance and a second substance that has an influence on an analysis of the first substance in regard to a concentration of the first substance, includes performing an analysis on the sample in regard to the concentration of the first substance to obtain sample analysis data, and deriving a result of analysis in regard to a concentration of the first substance based on the sample analysis data and adjustment information that is set based on the influence.

14 Claims, 6 Drawing Sheets

| SAMPLE | CONTAINING NO AFFECTING SUBSTANCE | | CONTAINING AFFECTING SUBSTANCE I | | CONTAINING AFFECTING SUBSTANCE II | |
|---|---|---|---|---|---|---|
| | THRESHOLD VALUE 1 | THRESHOLD VALUE 2 | THRESHOLD VALUE 1 | THRESHOLD VALUE 2 | THRESHOLD VALUE 1 | THRESHOLD VALUE 2 |
| SUBSTANCE A | 500 | 1500 | 300 | 1700 | 200 | 1400 |
| SUBSTANCE B | 500 | 1500 | 300 | 1700 | 100 | 1700 |
| SUBSTANCE C | 500 | 1500 | 500 | 1500 | 300 | 1700 |
| SUBSTANCE D | 500 | 1500 | 500 | 1500 | 500 | 1500 |

CONCENTRATION (mg/kg)

(56)  References Cited

OTHER PUBLICATIONS

H. Thoma et al., "PVC-Induced Chlorine-Bromine Exchange in the Pyrolysis of Polybrominated Diphenyl Ethers, -Biphenyls, -Dibenzodioxins and Dibenzofurans" Chemosphere, 1987, pp. 297-307, vol. 16, No. 1.

Written Opinion of the International Searching Authority with respect to International Patent Application No. PCT/JP2019/044422, dated Feb. 18, 2020.

International Search Report with respect to International Patent Application No. PCT/JP2019/044422, dated Feb. 18, 2020.

Notification of Reasons for Refusal dated May 30, 2023 from the Japanese Patent Office in application No. 2021-555678.

Communication dated Apr. 26, 2024, issued in Chinese Application No. 201980102032.3.

Jiang, Zhen-Juan et al., "Influence of β-arbutin on analysis result of hydroquinone in cosmetics by GC-MS", China Surfactant Detergent & Cosmetics, Custom Chemical Industries, Feb. 2017, vol. 47, No. 2, pp. 118-120 (10 pages total).

Communication issued Sep. 27, 2024 in Chinese application No. 201980102032.3.

* cited by examiner

F I G. 1
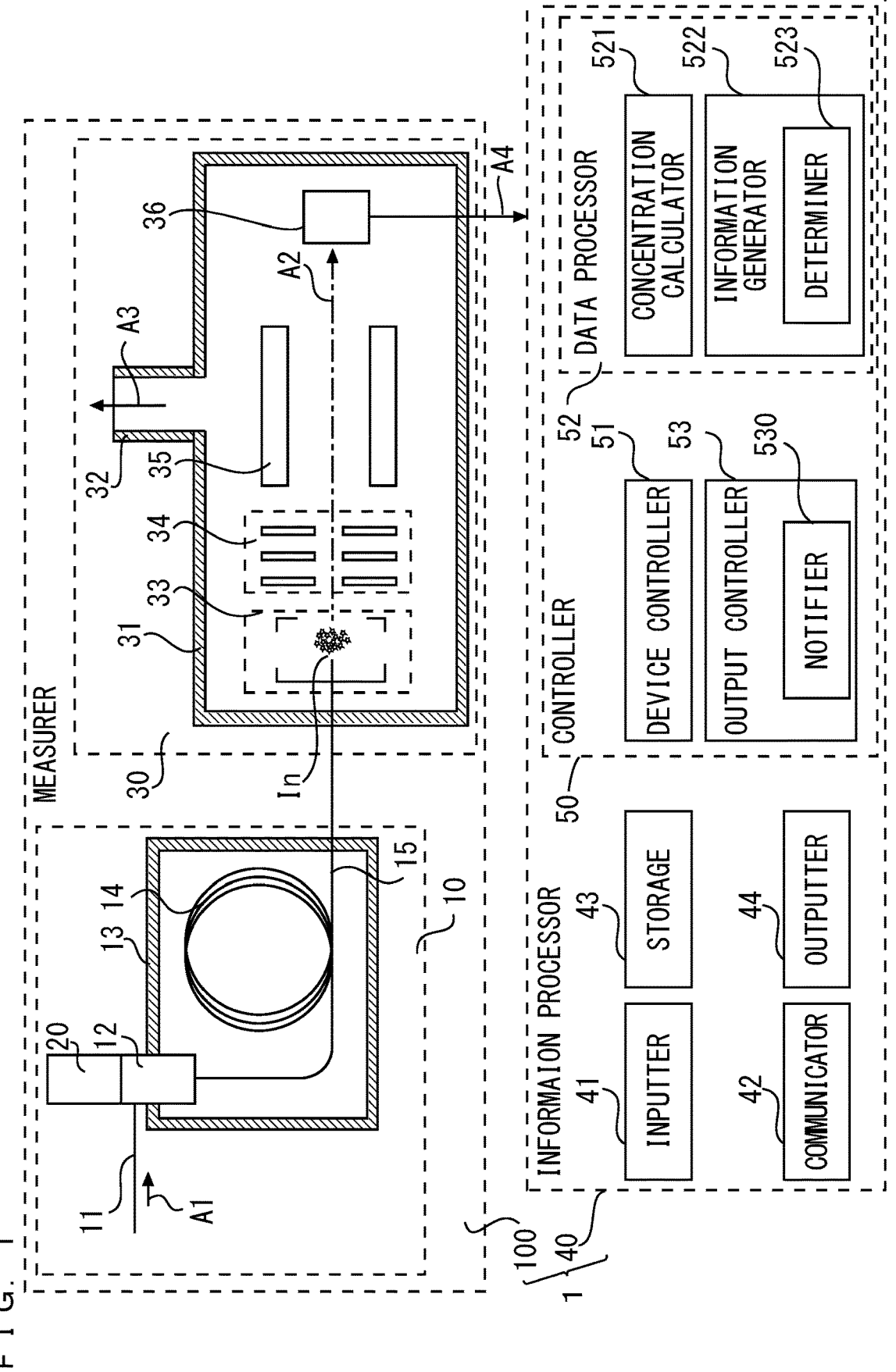

F I G.  2
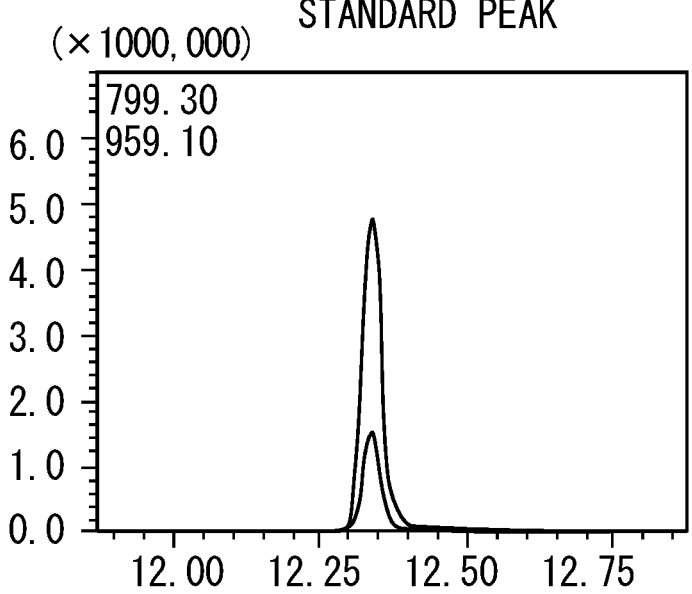
F I G.  3
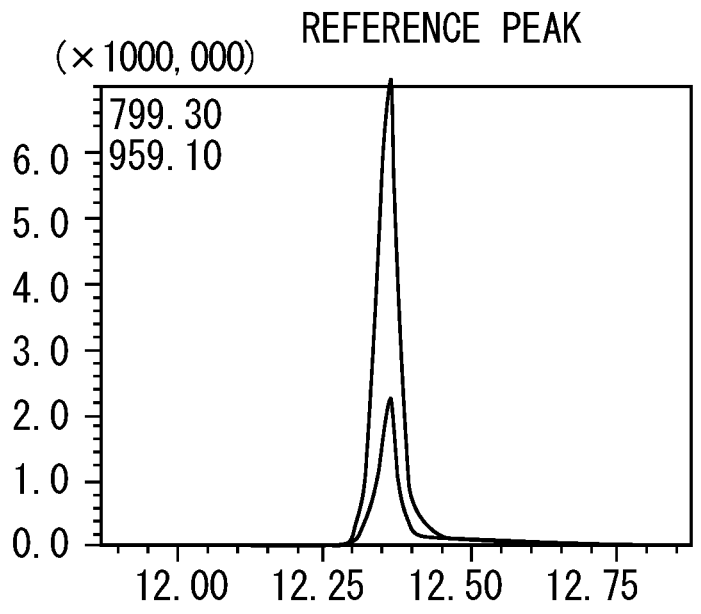

F I G.  4
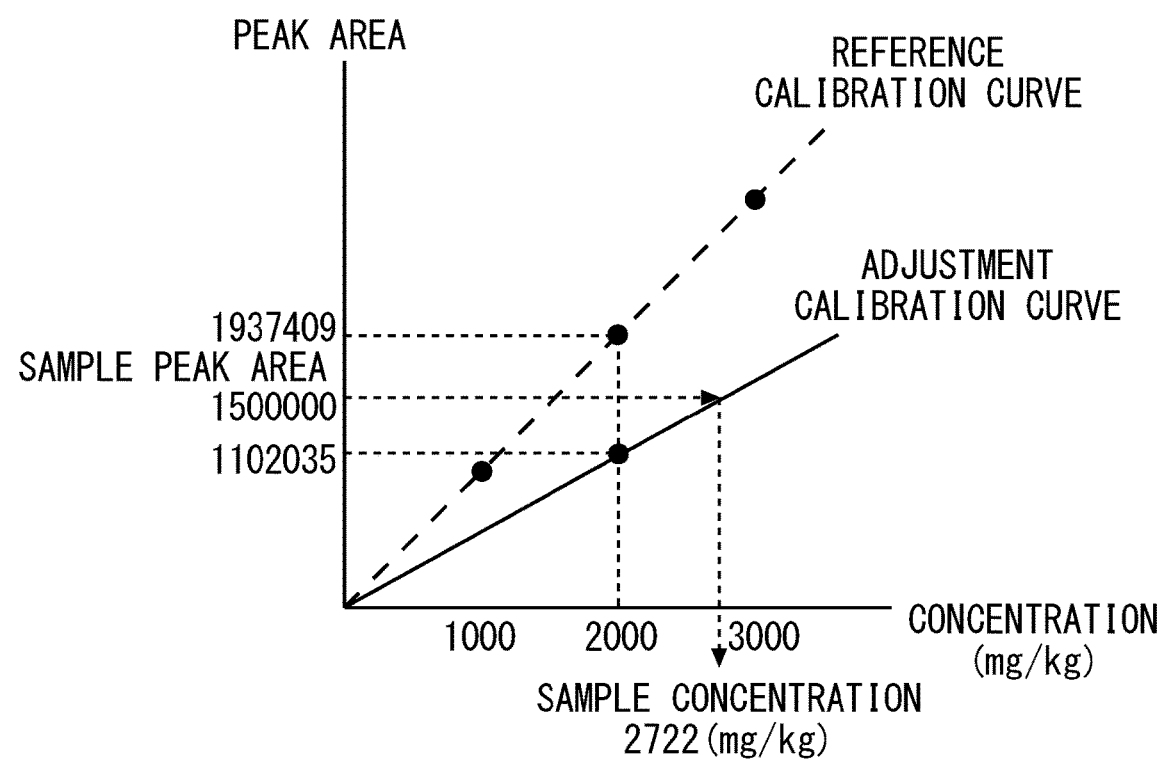

FIG. 5

| SAMPLE | CONTAINING NO AFFECTING SUBSTANCE | | CONTAINING AFFECTING SUBSTANCE I | | CONTAINING AFFECTING SUBSTANCE Ⅱ | |
|---|---|---|---|---|---|---|
| | THRESHOLD VALUE 1 | THRESHOLD VALUE 2 | THRESHOLD VALUE 1 | THRESHOLD VALUE 2 | THRESHOLD VALUE 1 | THRESHOLD VALUE 2 |
| SUBSTANCE A | 500 | 1500 | 300 | 1700 | 200 | 1400 |
| SUBSTANCE B | 500 | 1500 | 300 | 1700 | 100 | 1700 |
| SUBSTANCE C | 500 | 1500 | 500 | 1500 | 300 | 1700 |
| SUBSTANCE D | 500 | 1500 | 500 | 1500 | 500 | 1500 |

CONCENTRATION(mg/kg)

FIG. 6

| SAMPLE | CONTAINING NO AFFECTING SUBSTANCE | | CONTAINING AFFECTING SUBSTANCE I | | CONTAINING AFFECTING SUBSTANCE Ⅱ | |
|---|---|---|---|---|---|---|
| | THRESHOLD VALUE 1 | THRESHOLD VALUE 2 | THRESHOLD VALUE 1 | THRESHOLD VALUE 2 | THRESHOLD VALUE 1 | THRESHOLD VALUE 2 |
| SUBSTANCE A | 500 | 1500 | 200 | 1800 | 350 | 1950 |
| SUBSTANCE B | 500 | 1500 | 200 | 1800 | 350 | 1950 |
| SUBSTANCE C | 500 | 1500 | 200 | 1800 | 350 | 1950 |
| SUBSTANCE D | 500 | 1500 | 200 | 1800 | 350 | 1950 |

CONCENTRATION(mg/kg)

F I G.  7
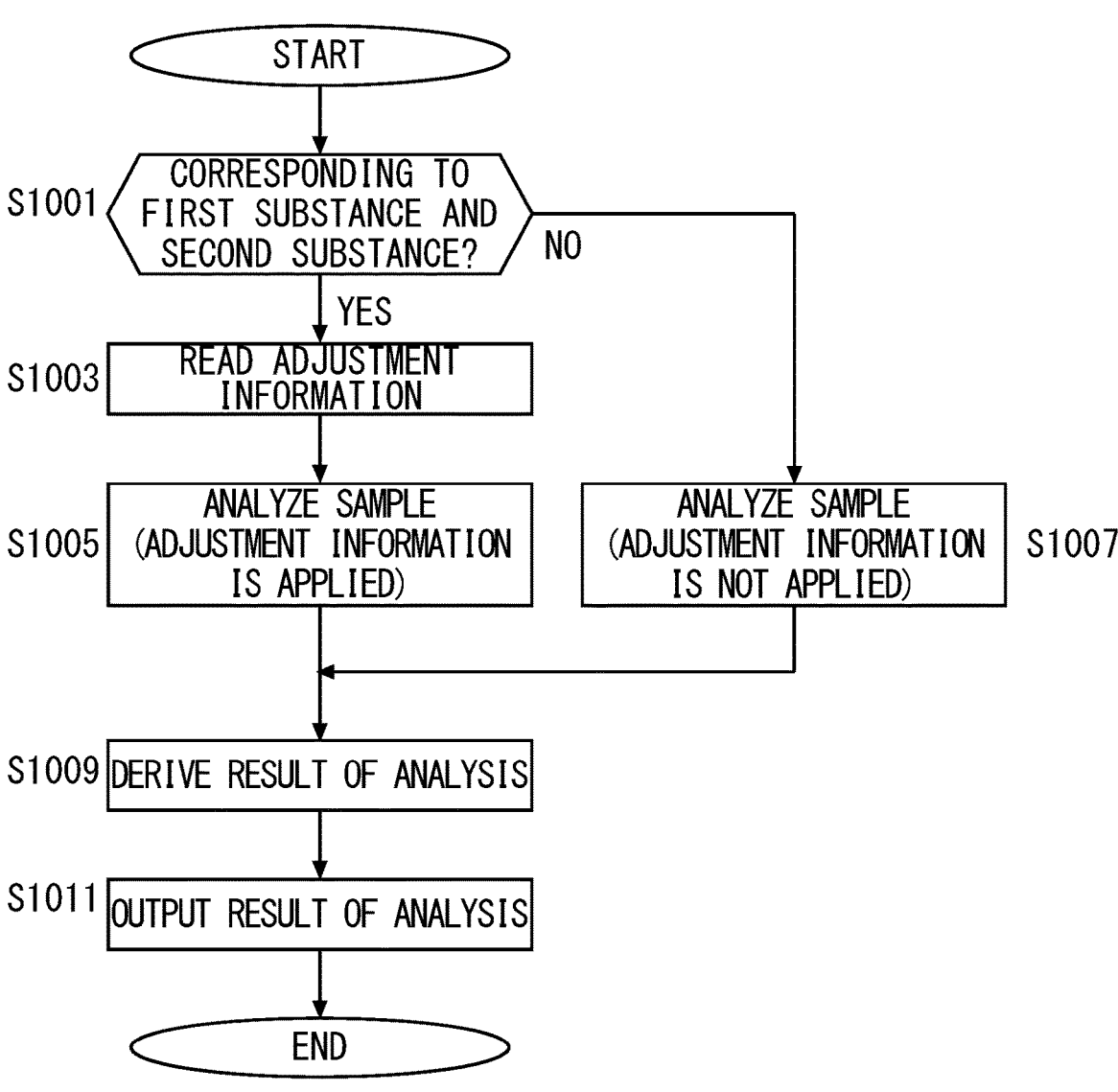

F I G . 8
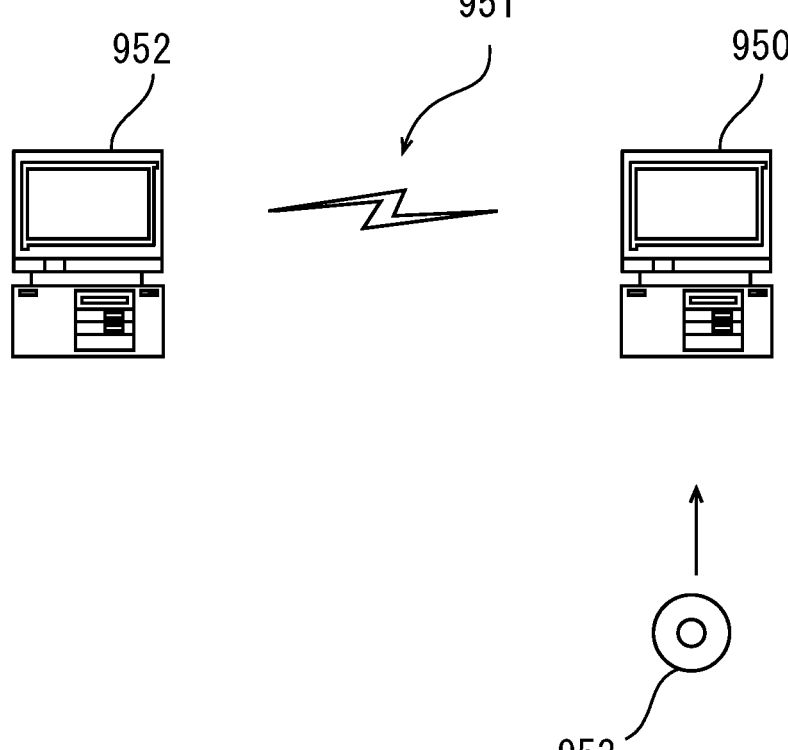

ANALYSIS METHOD AND ANALYSIS DEVICE

CROSS REFERENCE TO RELATED APPLICATIONS

This application is a National Stage of International Application No. PCT/JP2019/044422 filed Nov. 12, 2019.

TECHNICAL FIELD

The present invention relates to an analysis method and an analysis device.

BACKGROUND ART

In a case in which being analyzed by a Gas Chromatograph (GC), a Gas Chromatograph-Mass Spectrometer (GC-MS) or the like, the concentration, mass or the like of an analyte included in a sample is sometimes not accurately analyzed depending on a substance contained in the sample other than the analyte.

For example, it has been known that a detection signal intensity related to the concentration or mass of an analyte is smaller than a signal intensity to be originally detected due to the ionization suppressing effect of a substance contained as a contaminant in a sample. (see Non-Patent Document 1, for example.) On the other hand, in a case in which a contaminant has the ionization promoting effect, a detection signal intensity of a component to be analyzed may be larger than a signal intensity to be originally detected.

Further, a detection signal intensity of an analyte included in a sample may be influenced by a base material of the sample. For example, it has been known that, in a case in which the concentration or mass of a brominated flame retardant (Decabromodiphenyl ether (Deca-BDE), for example) included in Polyvinyl chloride (PVC) is analyzed with use of pyrolysis gas chromatography-mass spectrometry (Py-GC/MS), the signal intensity corresponding to Deca-BDE is smaller than that in a case in which Deca-BDE is contained in resin (polystyrene, for example) other than PVC. It is estimated that, this is because a reaction in which bromine constituting Deca-BDE and chlorine constituting PVC are exchanged occurs, and thus the signal intensity corresponding to Deca-BDE is smaller than an original intensity. (see Non-Patent Document 2, for example.)

In such a case, a plurality of reference samples containing the same substance as that of a sample to be analyzed but containing a component to be analyzed at different concentrations are prepared, a calibration curve is obtained based on a plurality of signal intensities corresponding to the component to be analyzed obtained by an analysis of those reference samples, and the signal intensity obtained by an analysis of the sample to be analyzed is applied to the calibration curve. Thus, the concentration or mass of the analyte in the sample to be analyzed is analyzed more accurately. However, since such procedure is complicated, it takes time and effort, and therefore there is a problem that the analysis cost increases.

CITATION LIST

[Non-Patent Document 1] Antignac et al. "The ion suppression phenomenon in liquid chromatography-mass spectrometry and its consequences in the field of residue analysis" Analytica Chimica Acta Vol. 529 pp 129-136, (2005)

[Non-Patent Document 2] Thoma et al. "PVC-INDUCED CHLORINE-BROMINE EXCHANGE IN THE PYROLYSIS OF POLYBROMINATED DIPHENYL ETHERS, -BIPHENYLS, -DIBENZODIOXINS AND DIBENZOFURANS" Chemosphere, Vol. 16, No. 1, pp 297 to 307, (1987).

SUMMARY OF INVENTION

Technical Problem

In regard to a sample containing an influencing substance (second substance) that influences an analysis of an analyte (first substrate), the concentration (content) or mass of the analyte (first substance) is analyzed accurately and highly efficiently.

Solution to Problem

A first aspect of the present invention relates to an analysis method of performing an analysis on a sample containing a first substance and a second substance that has an influence on an analysis of the first substance in regard to a concentration of the first substance, including performing an analysis on the sample in regard to the concentration of the first substance to obtain sample analysis data, and deriving a result of analysis in regard to a concentration of the first substance based on the sample analysis data and adjustment information that is set based on the influence.

A second aspect of the present invention relates to an analysis device that performs an analysis on a sample containing a first substance and a second substance that has an influence on an analysis of the first substance in regard to a concentration of the first substance, including a processing apparatus that derives a result of analysis in regard to a concentration of the first substance based on sample analysis data obtained by an analysis on the sample in regard to a concentration of the first substance and adjustment information that is set based on the influence.

A third aspect of the present invention relates to a non-transitory computer readable medium storing a program for causing an analysis device to execute an analysis process on a sample containing a first substance and a second substance that has an influence on an analysis of the first substance in regard to a concentration of the first substance, and the program derives a result of analysis in regard to the concentration of the first substance based on sample analysis data which is obtained by an analysis on the sample in regard to the concentration of the first substance and adjustment information that is set based on the influence, in the analysis process.

Advantageous Effects of Invention

With the present invention, in regard to a sample containing an influencing substance (second substance) that influences an analysis of an analyte (first substance), the concentration or mass of the analyte (first substance) can be analyzed accurately and highly efficiently.

BRIEF DESCRIPTION OF THE DRAWINGS

FIG. 1 is a conceptual diagram showing the configuration of an analysis device according to one embodiment.

FIG. 2 is a graph showing a standard peak corresponding to Deca-BDE in a standard sample.

FIG. 3 is a graph showing a reference peak corresponding to Deca-BDE in a reference sample.

FIG. 4 is a conceptual diagram showing a reference calibration curve and an adjustment calibration curve.

FIG. 5 is a table showing an example of threshold values used for evaluation.

FIG. 6 is a table showing an example of threshold values used for evaluation.

FIG. 7 is a flowchart showing a flow of an analysis method according to the one embodiment.

FIG. 8 is a conceptual diagram for explaining provision of a program.

DESCRIPTION OF EMBODIMENTS

Embodiments of the present invention will be described below. In the following embodiments, a first substance to be analyzed and included in a sample is also referred to as an analyte, and a second substance that influences the analysis of the analyte (first substance) is also referred to as an influencing substance.

EMBODIMENTS

Regarding Sample

While being intended to include both an analyte and an influencing substance, a sample is not limited in particular. For example, a sample may be constituted by an influencing substance that serves as its base material or may include an influencing substance separately from its base material. The type of each of an analyte and an influencing substance is not limited in particular. A sample may be solid, liquid or gas.

In a case in which the base material of a sample is not known, an analysis is performed such that the type of the base material of the sample is identified. As an analysis method, various analysis methods described below can be used. For example, Py-GC/MS shown in FIG. 1 may be used, or a Fourier Transform Infrared Spectrometer (FTIR) may be used. Even in a case in which the type of the base material of a sample is known, the above-mentioned analysis may be performed such that whether recognition of the base material is correct.

Examples of analytes include polybrominated diphenyl ethers (PBDE) such as Decabromodiphenylether (Deca-BDE), Pentabromodiphenylether, Hexabromodiphenylether or Octabromodiphenylether, PBB (Polybromobiphenyl) such as Decabromobiphenyl, Tetrabromobisphenol A (TBBPA), Hexabromocyclododecane (HBCD) or Phthalic esters such as bis (2-ethylhexyl) phthalate (DEHP), di-n-butyl phthalate (DBP), n-butylbenzyl phthalate (BBP), di-iso-nonyl phthalate (DINP), di-iso-decyl phthalate (DIDP) or di-n-octyl phthalate (DNOP).

Although brominated compounds have been used industrially as flame retardants for resin materials, and phthalate esters have been used industrially as plasticizers for resin materials, regulations are likely to be tightened due to negative impact on living organisms. Thus, importance of efficient analysis and evaluation for management of products containing these substances is increasing.

Examples of an influencing substance (second substance) contained in a sample include a chlorine-containing compound such as polyvinyl chloride (PVC). In the following description, chlorine and bromine does not indicate molecules but elements unless otherwise indicated.

Regarding Analysis

Analysis data in regard to the concentration (content) of an analyte included in a sample is acquired by the analysis of the sample. As analysis data, it is preferable to detect a signal intensity (peak) corresponding to an analyte. Analysis data acquired by the analysis of a sample is referred to as sample analysis data in the present specification. Sample analysis data is obtained under the influence of an influencing substance. Information for obtaining an accurate analysis result is generated based on the influence of an influencing substance on sample analysis data. This information is referred to as adjustment information in the present specification. Based on sample analysis data and adjustment information, an analysis result in regard to the concentration of an analyte is derived. Thus, it is possible to obtain an accurate analysis result in regard to the concentration of an analyte.

An analysis method is not limited in particular as long as a quantitative analysis can be performed. For example, at least one of gas chromatography, liquid chromatography, mass spectrometry (MS), gas chromatography/mass spectrometry (hereinafter referred to as GC/MS), pyrolysis gas chromatography/mass spectrometry (hereinafter referred to as Py-GC/MS), liquid chromatography/mass spectrometry (hereinafter referred to as LC/MS), fourier transform infrared spectroscopy, and spectrophotometry utilizing ultraviolet and visible light can be used.

Regarding Reference Sample

A reference sample refers to a sample that contains an analyte and does not contain an influencing substance that influences the analysis of the analyte. A reference sample is not limited in particular as long as an analyte can be accurately and stably analyzed.

Regarding Calculation of Concentration (Content)

A concentration of an analyte is obtained based on a signal intensity of the analyte obtained by the analysis of a sample, a reference sample or the like.

Regarding Substance Information About First Substance and Second Substance

In a case in which analysis data corresponding to an analyte (first substance) obtained by the analysis of a sample is different from analysis data to be originally obtained, it is considered that the sample contains an influencing substance (second substance) that influences the analysis of the analyte (first substance). For example, in a case in which the concentration of a first substance obtained by the analysis of a sample the concentration of an analyte of which is known is different from the known concentration, it is considered that the sample contains a second substance that influences the analysis of the first substance.

An influencing substance may or may not be identified. For example, in a case in which an analyte is brominated diphenyl ether (Deca-BDE, for example), PVC is identified as an influencing substance that influences the analysis of Deca-BDE in Py-GC/MS. In this case, a first substance and a second substance are set. On the other hand, in a case in which a certain type of an analyte is analyzed, when it is known that an analysis result is different from an analysis result to be originally obtained although an influencing substance cannot be identified, only the analyte (first substance) is set. On the contrary, in a sample having a certain base material, in a case in which it is known that an analysis result is different from an analysis result to be originally obtained regardless of a contained substance other than the base material, an influencing substance (second substance) is set as the substance of the base material.

Information in regard to a first substance and a second substance (referred to as substance information) may be input to an analysis device by an operator when an analysis is performed. Alternatively, the substance information may be stored in a storage of the analysis device and automatically read out when an analysis is performed.

Regarding Adjustment Information

Adjustment information is the information used to adjust analysis data, a threshold value for evaluation or the like for acquisition of an accurate analysis result in a case in which at least one of a first substance and a second substance is set. Although the form and generation procedure of adjustment information are not limited, adjustment information can be generated as described below, for example. Adjustment information may be input to the analysis device by the operator, or may be stored in advance in the storage of the analysis device in association with information in regard to a combination of the a first substance and a second substance and automatically read out.

1. Analysis of Standard Sample

A standard sample the concentration of an analyte substance (first substance) of which is known and which contains an influencing substance (second substance) is prepared. The composition of the standard sample is similar to that of the sample to be analyzed except that the concentrations of substances other than the analyte are known. The standard sample is analyzed, and a signal intensity (referred to as a standard peak) corresponding to the analyte is obtained. For example, in a case in which the concentration of Deca-BDE, which is an analyte contained in a PVC base material, which is an influencing substance, is subject to an analysis, PVC containing Deca-BDE at a known concentration is prepared as a standard sample. This standard sample is analyzed, so that a standard peak corresponding to Deca-BDE having the known concentration is obtained.

2. Analysis of Reference Sample

A plurality of reference samples that contain the same type of an analyte as that of a standard sample at the same concentration as that of the standard sample and containing no influencing substance are prepared. For example, polystyrene containing Deca-BDE at the same concentration as that of a standard sample is prepared as a reference sample. The reference sample is analyzed, so that a signal intensity (referred to as a reference peak) corresponding to an analyte is obtained. An analysis condition of the reference sample is the same as that of the standard sample.

3. Generation of Adjustment Information

In a case in which a standard sample is PVC containing Deca-BDE having a known concentration, and a reference sample is polystyrene containing Deca-BDE having the same concentration as that of the standard sample, the magnitude of a standard peak is smaller than that of a reference peak as described above. Adjustment information is generated based on a standard peak and a reference peak having different magnitudes. For example, a value of a standard peak intensity/a reference peak intensity, which is a ratio of peak intensity, can be used as the adjustment information. Alternatively, a value of a standard peak area/a reference peak area, which is a ratio of a peak area, can be used as the adjustment information.

4. Generation of Reference Calibration Curve

A plurality of auxiliary reference samples that are constituted by the same type of material as that of a reference sample except for the concentration of an analyte being different from that of the reference sample, and have different concentrations of the analyte are prepared. That is, the auxiliary reference samples are configured to have different concentrations of the analyte from that of the reference sample. These auxiliary reference samples are respectively analyzed, so that a plurality of signal intensities (referred to as auxiliary reference peaks) corresponding to the analyte are obtained. An analysis condition for the auxiliary reference samples is the same as that for a standard sample and the reference sample. For example, two auxiliary reference samples, which are polystyrene containing Deca-BDE at a lower concentration than that of the reference sample and polystyrene containing Deca-BDE at a higher concentration than that of the reference sample, are prepared. These auxiliary reference samples are analyzed, so that two auxiliary reference peaks corresponding to Deca-BDE are obtained.

A reference calibration curve in regard to the concentration of the analyte is generated based on the magnitude (a peak intensity or a peak area) of a reference peak and the plurality of auxiliary reference peaks. For example, the abscissa is set to indicate the peak area of the signal intensity corresponding to the analyte, and the ordinate is set to indicate the concentration of the analyte. The reference calibration curve is generated by plotting of the concentration of the analyte corresponding to each of the reference peak area and the plurality of auxiliary reference peak areas. The reference calibration curve may be generated in advance and stored in advance in the storage 43.

5. Generation of Adjustment Calibration Curve

An adjustment calibration curve is generated by adjustment of a reference calibration curve based on the above-mentioned adjustment information. The adjustment procedure is not limited in particular. For example, an adjustment calibration curve is an updated reference calibration curve obtained by multiplication of the slope of the reference calibration curve obtained by the above-mentioned procedure by a value of a standard peak area/a reference peak area. In a case in which an analyte is Deca-BDE, because the magnitude of a standard peak is smaller than the magnitude of a reference peak, a peak area ratio is smaller than 1. Therefore, the slope of the adjustment calibration curve is smaller than the slope of the reference calibration curve. That is, in a case in which a value of any peak area is applied to the adjustment calibration curve, a concentration that is larger than a concentration obtained in a case in which the same value is applied to the reference calibration curve is represented. That is, influence of an influencing substance on the analyte is corrected by application of the adjustment calibration curve.

6. Analysis of Sample

A sample to be analyzed is analyzed, and a signal intensity (referred to as an analysis peak) corresponding to an analyte (first substance) is obtained. An analysis condition for the sample is the same as that for a standard sample. An analysis peak area, which is an area of an analysis peak, is obtained and applied to the above-mentioned adjustment calibration curve. The adjustment calibration curve is obtained by adjustment of a reference calibration curve based on adjustment information. As described above, the adjustment information is the information for obtaining an accurate analysis result by correction of influence of an influencing substance on sample analysis data. That is, it is possible to obtain an accurate analysis result in which influence of an influencing substance on sample analysis data is corrected by using an adjustment calibration curve.

Although an adjustment calibration curve generated in advance may be stored in the storage of the analysis device and read out to be used, a more accurate analysis result can be expected by an analysis of a reference sample and an auxiliary reference sample under the same condition as that of a sample to be analyzed immediately before or immediately after an analysis of the sample to be analyzed and generation of the adjustment calibration curve with use of the data.

Regarding Analysis Device

The analysis device according to the present embodiment will be described with reference to the drawings. FIG. 1 is a conceptual diagram showing the configuration of the analysis device according to the present embodiment. The analysis device 1 includes a Pyrolysis Gas Chromatograph-Mass Spectrometer (hereinafter referred to as the device 1 or a Py-GCMS) and includes a measurer 100 and an information processor 40. The measurer 100 includes a pyrolysis gas chromatograph 10 and a mass spectrometry unit 30.

As long as being able to perform a quantitative analysis, the analysis device according to the present embodiment is not limited in particular. As the analysis device, a Gas Chromatograph (GC), a Liquid Chromatograph (LC), a mass spectrometer, a Gas Chromatograph-Mass Spectrometer (GC-MS), a Liquid Chromatograph-Mass Spectrometer (LC-MS), a fourier transform infrared spectrometer, a UV-visible spectrophotometer or the like can be used.

The pyrolysis gas chromatograph 10 includes a pyrolysis apparatus 20, a carrier gas flow path 11, a sample introducer 12 into which a sample, a standard sample, a reference sample and an auxiliary reference sample (hereinafter collectively referred to as a "sample and the like") that are pyrolytically decomposed in the pyrolysis apparatus 20 are introduced, a column temperature adjuster 13, a separation column 14 and a sample gas introduction tube 15. The mass spectrometry unit 30 includes a vacuum container 31, an exhaust port 32, an ionizer 33 that ionizes a sample and the like and generates ions In, an ion adjuster 34, a mass separator 35 and a detector 36.

The information processor 40 includes an inputter 41, a communicator 42, a storage 43, an outputter 44 and a controller 50. The controller 50 includes a device controller 51, a data processor 52 and an output controller 53. The data processor 52 includes a concentration calculator 521 and an information generator 522. The output controller 53 includes a notifier 530. The information generator 522 includes a determiner 523. The measurer 100 separates a sample and the like into components by an analysis and detects the sample and the like.

The pyrolysis gas chromatograph 10 pyrolytically decompose a sample and the like and then obtains components included in the sample and the like by separation based on physical properties or chemical properties. A sample and the like are gas or gaseous when being introduced into the separation column 14 and are referred to as sample gases.

The carrier-gas flow path 11 is a flow path of a carrier-gas such as helium, and the carrier-gas is introduced into the thermal decomposition device 20 through the carrier-gas flow path 11 (the arrow A1). The pyrolysis apparatus 20 pyrolytically decompose the sample and the like and introduces the sample and the like into the sample introducer 12. The type of the pyrolysis apparatus 20 is not limited in particular, and may be a furnace type, an induction heating type or a filament type. The sample introducer 12 includes a portion into which a sample and the like are introduced, a split vent, etc. and introduces a sample gas suitably and selectively into the separation column 14.

The separation column 14 includes a column such as a capillary column. The temperature of the separation column 14 is controlled at several hundred ° C. or less by the column temperature adjuster 13 including a column oven or the like. A sample gas is separated into components based on a distribution coefficient between a mobile phase and a stationary phase of the separation column 14, etc., and components into which the sample gas is separated are respectively eluted from the separation column 14 at different times and introduced into the ionizer 33 of the mass spectrometry unit 30 through the sample gas introduction tube 15.

The mass spectrometry unit 30 includes a mass spectrometer, ionizes a sample and the like that have been introduced into the ionizer 33 and detects ions by mass separation. A path through which ions In generated by the ionizer 33 flow is schematically indicated by the arrow A2. Ions In can include ions in which electrons, atoms or atom groups are combined with a sample and the like, ions derived from the sample and the like such as ions generated by decomposition such as dissociation, etc. of the sample and the like.

As long as being able to detect ions In with desired accuracy by mass spectrometry, the type of a mass spectrometer that constitutes the mass spectrometry unit 30 is not limited in particular. The mass spectrometry unit 30 that includes one or more mass spectrometers of any type may be used.

The vacuum container 31 of the mass spectrometry unit 30 includes the exhaust port 32. The exhaust port 32 is connected to a vacuum exhaust system (not shown) that includes a turbo-molecular pump or the like that can realize a high vacuum state such as $10^{-2}$ Pa or less and its auxiliary pump. In FIG. 1, exhaust of gas in the vacuum container 31 is indicated schematically by the arrow A3.

The ionizer 33 of the mass spectrometry unit 30 includes an ion source and ionizes a sample and the like introduced into the ionizer 33 by electronic ionization. Because a sample and the like are dissociated when being electronically ionized, ions In include fragment ions obtained by dissociation of the sample and the like. Ions In generated by the ionizer 33 are introduced into the ion adjuster 34.

An ionization method performed by the ionizer 33 is not limited in particular as long as ionization can be performed with desired efficiency. In case of GC/MS, chemical ionization or the like may be used. Also in case of LC/MS, an electrospray method or the like can be suitably used.

The ion adjuster 34 of the mass spectrometry unit 30 includes an ion transport system such as a lens electrode or an ion guide and makes adjustment by converging a flow of ions In using electromagnetic action, etc. Ions In emitted from the ion adjuster 34 are introduced into the mass separator 35.

The mass separator 35 of the mass spectrometry unit 30 includes a quadrupole mass filter and performs mass separation of introduced ions In. The mass separator 35 causes ions In to pass selectively in accordance with an m/z value by a voltage applied to the quadrupole mass filter. Ions In obtained by mass separation in the mass separator 35 enter the detector 36.

The detector 36 of the mass spectrometry unit 30 includes an ion detector and detects entered ions In. The detector 36 converts a detection signal obtained by detection of entered ions In into a digital signal by an A/D converter (not shown) and outputs the digitalized detection signal to the information processor 40 as measurement data (the arrow A4).

The information processor 40 includes an information processing apparatus such as an electronic calculator and executes processes such as communication, storage, calculation, etc. in regard to various data in addition to serving as an interface with respect to an operator of the analysis apparatus 1. Further, part of data used by the analysis device 1 may be saved in a remote server or the like, and part of a calculation process executed by the analysis device 1 may be executed by the remote server or the like.

The inputter 41 is constituted by an input device such as a mouse, a keyboard, various buttons or a touch panel. The inputter 41 receives information and so on required for control of the measurer 100 or a process executed by the controller 50 from the operator. Information in regard to an m/z for detection of ions In is input via the inputter 41. The communicator 42 is constituted by a communication device that can communicate via wireless connection or wired communication such as the Internet, and suitably transmits and receives data and so on in regard to the control of the measurer 100 or a process executed by the controller 50.

The storage 43 is constituted by a non-volatile storage medium and stores measurement data (a signal intensity, for example), a program for execution of a process by the controller 50, data required for execution of a process by the data processor 52, data obtained by the process, etc. The storage 43 stores setting information of a first substance and a second substance, adjustment information, information in regard to a reference calibration curve and/or an adjustment calibration curve, information in regard to a threshold value, information in regard to a concentration of a sample and the like, etc., described above.

The outputter 44 is constituted by a display device such as a liquid crystal monitor, a printer or the like. The outputter 44 outputs data or the like obtained by a process executed by the data processor 52 to a display device or a printer.

The controller 50 includes a processor such as a CPU, controls an operation of each component of the measurer 100 and processes measurement data. The device controller 51 of the controller 50 controls the operation of each component of the measurer 100. For example, the device controller 51 can detect ions In in a scan mode in which an m/z of ions passing through the mass separator 35 changes continuously or an SIM (Selective Ion Monitoring) mode in which a plurality of ions having a specific m/z pass. In this case, the device controller 51 changes a voltage of the mass separator 35 such that ions In having an m/z that is set based on input from the inputter 41, or the like selectively pass through the mass separator 35. The data processor 52 of the controller 50 processes and examines measurement data.

The concentration calculator 521 calculates signal intensities of an analyte from the measurement data. The concentration calculator 521 generates data corresponding to a mass chromatogram (referred to as mass chromatogram data) from the measurement data. A mass chromatogram is a graph in which the abscissa indicates a retention time and the ordinate indicates a signal intensity of detected ions. The same applies to following each diagram. The concentration calculator 521 calculates a value of a peak intensity or a peak area of a peak corresponding to an analyte, and applies the calculated peak intensity or the calculated peak area to a reference calibration curve or an adjustment calibration curve to calculate the concentration of the analyte. As long as the magnitude of a signal intensity corresponding to an analyte can be quantified based on measurement data, a value subject to be applied to a reference calibration curve or an adjustment calibration curve is not limited in particular to a peak intensity or a peak area. Further, the concentration of a substance to be detected is not limited in particular to being calculated based on a reference calibration curve or an adjustment calibration curve.

The information generator 522 generates adjustment information based on a concentration of an analyte calculated by the concentration calculator 521, or a peak intensity or a peak area. Further, the determiner 523 of the information generator 522 determines a sample based on a concentration of an analyte calculated by the concentration calculator 521, or a peak intensity or a peak area. Specifically, determination subject data such as a concentration of an analyte, or a peak intensity, a peak area, or the like are compared with a threshold value for determination stored in the storage 43, and the magnitude of the determination subject data with respect to the threshold value is determined.

In addition to the above-mentioned determination, the determiner 523 may determine whether an analyte and other substances contained in a sample respectively correspond a first substance or a second substance. That is, the determiner 523 may determine whether a combination of an analyte and the other substances contained in a sample is equivalent to any information in regard to a combination of the first substance and the second substance stored in the storage 43.

The information generator 522 generates information based on a result of determination by the determiner 523. The output controller 53 generates an image including analysis information or the like based on the information generated by the information generator 522 and controls the outputter 44 to output the image.

The notifier 530 of the output controller 53 outputs a notification for notifying the operator of at least part of the analysis information. While a notification method performed by the notifier 530 is not limited in particular, a notification may be displayed as a pop-up message in a screen of the outputter 44 or a lighting device (not shown) such as a lamp may be lit up.

As the content of notification, in a case in which a calculated concentration of an analyte in a sample, or a peak intensity or peak area exceeds a threshold value, it is possible to notify that the concentration of the analyte is higher than a prescribed value. Further, it is possible to notify that a sample contains an influencing substance (second substance) that influences an analysis of the analyte (first substance). Furthermore, it is possible to make notification of the content of the adjustment information or notify that the adjustment calibration curve is to be applied.

Next, an adjustment example will be described with reference to the drawings.

Adjustment Example 1

In the present adjustment example, a sample the base material of which is PVC (polyvinyl chloride) and which contains Deca-BDE will be described, by way of example. An analyte in the sample is Deca-BDE. The analysis device 1 shown in FIG. 1 is used for an analysis.
1. Input of Substance Information The operator inputs the name or the reference number of Deca-BDE as the analyte and the name or the reference number of PVC as a contained substance other than the analyte using the inputter 41 of the analysis device 1. In addition to the base material, the operator inputs the names or the reference numbers of all of contained substances other than the analyte. The determiner 523 of the analysis device 1 determines whether a substance the name or the reference number of which the operator has input corresponds to a first substance and/or a second substance based on information (also referred to as a substance database) in regard to a combination of the first substance and the second substance stored in the storage 43. In a case in which the substance the name or the reference number of which the operator has input corresponds to the first substance and/or the second substance as a result of determination, the information generator 522 generates an image displaying such a notice and controls the outputter 44 and causes the notifier 530 to output the image.

In a case in which the information that the analysis of the analyte in the sample is to be influenced by the other contained substances is known although not being stored in the storage, the operator can input information in regard to these combinations and store the information as new substance information.

In a case in which the substances contained in the sample are not recognized, the substances contained in the sample are identified first, and then names or the reference numbers of these substances are input to the inputter 41. A qualitative analysis device such as a fourier transform infrared spectrometer can be used to identify substances. In this case, the names or the reference numbers sign of the substances may be manually input by the operator or may be automatically input from the qualitative analysis device to the storage 43.

2. Analysis of Standard Sample

A standard sample that contains PVC (polyvinyl chloride) as a base material and contains Deca-BDE as an analyte material at a concentration of 2000 mg/kg is prepared. That is, the standard sample is constituted by substances common to the sample except that Deca-BDE as the analyte has a known concentration.

The standard sample is analyzed by the analysis device 1, and a mass spectrum of the standard sample is generated. The determiner 523 selects a peak corresponding to Deca-BDE in the mass spectrum based on the information in regard to the substances and the spectrum stored in the storage 43.

FIG. 2 shows a standard peak corresponding to Deca-BDE in the standard sample obtained by the above-mentioned procedure. In FIG. 2, the abscissa indicates a retention time, and the ordinate indicates a signal intensity. The two peaks shown in FIG. 2 indicate signals corresponding to respective fragment ions obtained by an analysis performed with use of two types of fragment ions. The concentration calculator 521 calculates a peak area of a peak corresponding to Deca-BDE, that is, a standard peak area and stores the peak area in the storage 43. The calculated standard peak area indicates 1102035 (counts).

3. Analysis of Reference Sample

A reference sample that contains polysterene as a base material and contains Deca-BDE at a concentration of 2000 mg/kg is prepared. That is, the reference sample contains Deca-BDE as an analyte at the same concentration as that of the standard sample, and the base material is constituted by polystyrene which does not influence an analysis of Deca-BDE.

The reference sample is analyzed by the analysis device 1, and a mass spectrum of the reference sample is generated. The determiner 523 selects a peak corresponding to Deca-BDE in the mass spectrum based on the information in regard to the substances and the spectrum stored in the storage 43.

FIG. 3 shows a reference peak corresponding to Deca-BDE in the reference sample obtained by the above-mentioned procedure. In FIG. 3, the abscissa indicates a retention time, and the ordinate indicates a signal intensity. The two peaks shown in FIG. 3 indicate signals corresponding to respective fragment ions obtained by an analysis performed with use of two types of fragment ions. These fragment ions are similar to those used in the analysis of the standard sample. The concentration calculator 521 calculates a peak area of a peak corresponding to Deca-BDE, that is, a reference peak area, and stores the peak area in the storage 43. The calculated reference peak area indicates 1937409 (counts).

4. Calculation of Adjustment Information

The information generator 522 calculates a value of a peak area ratio=a standard peak area/a reference peak area based on the standard peak area and the reference peak area, described above, calculated by the concentration generator 521, and stores the calculated value in the storage 43 as adjustment information. In the present adjustment example, because 1102035/1937409=0.57, 0.57 is stored in the storage 43 as the adjustment information.

5. Generation of Reference Calibration Curve

Two auxiliary reference samples that contain polystyrene as a base material and respectively contain Deca-BDE at two concentrations of 1000 mg/kg and 3000 mg/kg are prepared.

These auxiliary reference samples are analyzed by the analysis device 1, and mass spectrums of the auxiliary reference samples are generated. The determiner 523 selects a peak corresponding to Deca-BDE in the mass spectrum based on the information in regard to the substances and the spectrum stored in the storage 43. The concentration calculator 521 calculates peak areas of peaks corresponding to Deca-BDE, in other words, two auxiliary reference peak areas and stores the peak areas in the storage 43.

The data processor 52 generates a reference calibration curve in regard to the concentration of Deca-BDE using the reference peak area and the two auxiliary reference peak areas and displays the reference calibration curve in the notifier of the output controller 53. In FIG. 4, the reference calibration curve generated by the above-mentioned procedure is indicated by the broken line.

6. Generation of Adjustment Calibration Curve

The data processor 52 reads the adjustment information stored in the storage 43, adjusts the reference calibration curve using the adjustment information and generates an adjustment calibration curve. For example, the adjustment calibration curve the slope of which is a value obtained by multiplication of a slope (differential coefficient) of the reference calibration curve by 0.57, which is the adjustment information, is generated. In FIG. 4, the adjustment calibration curve generated by the above-mentioned procedure is indicated by the solid line. The adjustment calibration curve is a calibration curve to be applied to the analysis of the sample.

7. Analysis of Sample

The sample is analyzed by the analysis device 1, and a mass spectrum of the sample is generated. The determiner 523 selects a peak corresponding to Deca-BDE in the mass spectrum based on the information in regard to the substances and the spectrum stored in the storage 43. The concentration calculator 521 calculates a peak area of a peak corresponding to Deca-BDE, that is, an analysis peak area, and stores the peak area in the storage 43. The concentration calculator 521 applies the calculated analysis peak area to the adjustment calibration curve to calculate a concentration of Deca-BDE in the sample, and stores the concentration in the storage 43.

FIG. 4 shows a process of calculating the concentration of the sample. For example, in a case in which a peak area (sample peak area) of a peak corresponding to Deca-BDE calculated by the analysis of the sample is 1500000, this value is applied to the adjustment calibration curve, and the concentration of Deca-BDE is calculated as 2722 mg/kg. As is evident from FIG. 4, in a case in which the sample peak area is not applied to the adjustment calibration curve but is applied to the reference calibration curve, the concentration of Deca-BDE is calculated as 1548 mg/kg. This is an analysis result of a case in which the analysis of Deca-BDE is influenced by PVC and is a much lower value than an original concentration.

According to the present adjustment example, it is possible to accurately and highly efficiently perform the analysis in regard to the concentration of the first substance in the sample containing the second substance that influences the analyte (first substance) by using the adjustment calibration curve generated by adjustment of the reference calibration curve based on the adjustment information as described above.

In the present adjustment example, with use of the auxiliary reference samples in addition to the reference sample, the samples having a plurality of concentrations that include the concentration of the analyte in the reference sample were analyzed, and the reference calibration curve was generated based on the results thereof. However, the reference calibration curve may be generated with use of only the reference sample and not the auxiliary reference samples. In this case, a straight line passing through an origin and a point obtained by plotting of the peak area of the reference peak obtained by the analysis of the reference sample and the concentration of the analyte is used as a reference calibration curve.

A reference calibration curve sometimes does not pass through an origin. In this case, the reference calibration curve can be expressed by $x=(y-b)/a$ in a case in which a concentration is represented by the x axis (abscissa) and a peak area is represented by the y axis (ordinate). Here, "a" represents the slope of the reference calibration curve, and "b" represents the intercept of the reference calibration curve. In this case, the adjustment calibration curve can be expressed as $x=(y-b)/a'$, "a'" being a product of the adjustment information (0.57 in the present adjustment example) and the slope "a."

It has been explained that the adjustment calibration curve is generated when the slope "a" of the reference calibration curve is changed to the slope "a'" based on the adjustment information. However, generation of the adjustment calibration curve is not limited this, and the adjustment calibration curve can be suitably generated based on the content of the adjustment information. For example, the adjustment calibration curve may be obtained by movement of the reference calibration curve upward or downward. Further, the slope of the reference calibration curve may be partially changed, and an adjustment calibration curve may be a quadratic curve, for example.

In the present adjustment example, the adjustment information, the reference calibration curve, the adjustment calibration curve and the like were generated based on the peak area. However, they may be generated based on a peak height instead of the peak area.

In the present adjustment example, the standard sample, the reference sample and the auxiliary reference samples were respectively analyzed, the reference calibration curve was obtained based on the obtained signal intensity, the adjustment information was calculated, the adjustment calibration curve was generated based on the calculated adjustment information, and the result of analysis was derived by application of the signal intensity obtained by the analysis of the sample to the adjustment calibration curve. However, the reference calibration curve, the adjustment information, the auxiliary reference samples and the like may be stored in the storage 43 of the analysis device 1 in advance. For example, when analysis data is generated by an analysis of a sample, a result of analysis may be obtained by application of the analysis data to an adjustment calibration curve stored in the storage 43.

In a case in which a base material of a sample is unknown, an analysis for identifying the base material of the sample is performed prior to generating the above-mentioned analysis data. In this case, the information generator 522 may automatically generate an adjustment calibration curve using adjustment information stored in advance in the storage 43 and a reference calibration curve based on information (substance information) in regard to the type of the identified base material, and apply this adjustment calibration curve to the above-mentioned analysis data to obtain a result of analysis.

While the analysis of the standard sample, the analysis of the reference sample, the calculation of the adjustment information, the generation of the reference calibration curve, the generation of the adjustment calibration curve and the analysis of the sample are described in this order in the present adjustment example, the present invention is not limited to this. For example, after an analysis of a sample, a standard sample or a reference sample is analyzed, adjustment information is obtained, and an adjustment calibration curve may be generated based on the adjustment information.

Adjustment Example 2

In the adjustment example 1, the procedure for accurately obtaining a concentration of an analyte in a sample is described. In the present adjustment example, the procedure for setting a threshold value based on adjustment information with respect to a concentration or a signal intensity obtained by an analysis of a sample and evaluating the sample will be described. In the present adjustment example, an adjustment calibration curve is not used.

An analysis of a standard sample, an analysis of a reference sample, calculation of adjustment information and generation of a reference calibration curve, which are performed with use of the analysis device 1, are performed in accordance with the procedures performed in the adjustment example 1.

1. Input of Substance Information and Evaluation Threshold Value

The substance information is input in accordance with the procedure explained in the adjustment example 1. Further, in the present adjustment example, a threshold value (referred to as an evaluation threshold value) as an evaluation index of an analyte is input from the inputter 41. The input evaluation threshold value is stored in the storage 43 together with the substance information. The evaluation threshold value may be set in advance and stored in the storage 43 in advance.

2. Generation of Adjustment Threshold Value

The data processor 52 adjusts the evaluation threshold based on the adjustment information to generate an adjustment threshold value. The adjustment threshold value is a threshold value that is set for correcting the influence of an influencing substance in the analysis of the analyte and correctly evaluating the analyte. For example, an evaluation threshold value for evaluating a concentration of Deca-BDE will be described. As described above, a signal intensity corresponding to Deca-BDE obtained by an analysis of PVC containing Deca-BDE is smaller than a signal intensity to be originally obtained. That is, the concentration of Deca-BDE is evaluated based on an adjustment threshold value generated to be smaller than an evaluation threshold value. The generated adjustment threshold value is stored in the storage 43 as information related to a substance.

3. Analysis of Sample

A sample is analyzed by the analysis device 1, and a mass spectrum of the sample is generated. The determiner 523 selects a peak corresponding to Deca-BDE in the mass spectrum based on the information in regard to substances and the spectrum stored in the storage 43. The concentration calculator 521 calculates a peak area of a peak corresponding to Deca-BDE, that is, an analysis peak area, and stores the peak area in the storage 43. In the present adjustment example, the concentration calculator 521 applies the calculated analysis peak area to a reference calibration curve to calculate the concentration of Deca-BDE in the sample. The calculated concentration is influenced by PVC and is a lower value than an original concentration. In the present specification, this concentration is referred to as an assumed concentration.

4. Evaluation of Sample

The determiner 523 evaluates the analyte (the concentration of Deca-BDE in the present adjustment example) in the sample by comparing the assumed concentration with the adjustment threshold value. As described above, in the present adjustment example, even with the influence of PVC, the concentration of Deca-BDE in the sample can be accurately evaluated.

In the above-mentioned description, the procedure for evaluating the concentration of the analyte is described with a sample the base material of which is PVC (polyvinyl chloride) and which contains Deca-BDE as an example. With this procedure, an adjustment threshold value can be set based on adjustment information in regard to various combinations of an analyte and an influencing substance other than the above-mentioned combination of an analyte and an influencing substance of a sample.

The table shown in FIG. 5 shows examples of adjustment thresholds for evaluating various sample combinations of an analyte and an influencing substance. FIG. 5 shows examples of two adjustment threshold values set with respect to three types of samples respectively containing analytes (compounds) A, B, C and D. The three types of samples correspond a sample containing no influencing substance that influences an analysis of an analyte, a sample containing an influencing substance I and a sample containing an influencing substance Ⅱ. For example, the two adjustment thresholds are set in a case in which there are three methods of disposing a sample, and the two adjustment thresholds are used as indices for determining which disposal method is to be applied. That is, it is assumed that a first disposal method is applied in a case in which the value of an analyte is lower than a threshold value 1, a second disposal method is applied in a case in which the value of the analyte is between the threshold value 1 and a threshold value 2, and a third disposal method is applied in a case in which the value of the analyte is higher than the threshold value 2. A threshold value applied to the sample containing no influencing substance is an evaluation threshold value, and is not adjusted based on adjustment information.

As for the sample containing the influencing substance I and the sample containing the influencing substance Ⅱ, the threshold value 1 and the threshold value 2 that are adjusted with use of the adjustment information based on the substance information of the analyte and the influencing substance are set.

While each threshold value is individually set based on the adjustment information as described above in the table shown in FIG. 5, each threshold value may be set based on a formula describing the relationship between the evaluation threshold value and the adjustment threshold value based on the adjustment information. For example, the threshold value 1 (T11) for each analyte in regard to the sample containing the influencing substance I may be a value smaller than the evaluation threshold value (the threshold value 1 in regard to the sample not containing the influencing substance: T1B) by α mg/kg. That is, T11=T1B+α can hold. Further, the threshold value 2 (T12) for each analyte in regard to the sample containing the influencing substance I may be a value larger than the evaluation threshold value 2 (T2B) by β mg/kg. That is, T12=T2B+β can hold. Further, in regard to the threshold value 1 (T21) and the threshold value 2 (T22) for each analyte in regard to the sample containing the influencing substance Ⅱ, T21=T1B×γ, and T22=T2B×δ, respectively. Here, each value of coefficients α, β, γ and δcan be suitably set based on the adjustment information, the purpose of an analysis, etc.

FIG. 6 shows an example of the adjustment thresholds that are set in this manner for sample evaluation. The threshold values shown in FIG. 6 are set threshold values in in a case in which α=−300 (mg/kg), β=300 (mg/kg), γ=0.7 and δ=1.3.

In the above-mentioned description, it is described that a sample is evaluated by comparison between a concentration (assumed concentration) of an analyte and an adjustment threshold value. However, even in a case in which a concentration is not obtained, a threshold value may be set for a signal intensity obtained by an analysis. For example, a peak area or a peak intensity corresponding to an analyte in regard to a signal intensity may be obtained, and a sample may be evaluated by comparison of the peak area or the peak intensity with an adjustment threshold value set based on adjustment information.

Also in the present adjustment example, in a case in which the base material of the sample is unknown, an analysis for identifying the base material of the sample is performed prior to generation of the above-mentioned analysis data. In this case, the information generator 522 may automatically generate an adjustment threshold value using adjustment information and an evaluation threshold value stored in advance in the storage 43 based on information (substance information) in regard to the type of the identified base material, and apply this adjustment threshold value to the above-mentioned analysis data to obtain a result of analysis.

FIG. 7 is a flowchart showing a flow of an analysis method of the present embodiment. In the step S1001, the determiner 523 determines whether a first substance and a second substance are contained in a sample to be analyzed. That is, substance information is determined. In a case in which the first substance and the second substance are contained as a result of determination, an affirmative determination is made, and the process proceeds to the step S1003. On the other hand, in a case in which the first substance or the second substance is not contained as a result of determination, a negative determination is made, and the process proceeds to the step S1007.

In the step S1003, the data processor 52 reads the adjustment information from the storage 43, and the process proceeds to the step S1005. In the step S1005, the concentration calculator 521 analyzes the sample by applying adjustment information and obtains a concentration of an analyte in the sample, and the process proceeds to the step S1009.

In the step S1007, the concentration calculator 521 obtains the concentration of the analyte in the sample, and the process proceeds to the step S1009. That is, in the step S1007, the adjustment information is not applied to the analysis of the sample. This is because there is no need to adjust the analysis data since the sample does not contain an influencing substance that influences the analysis of the sample.

In the step S1009, the determiner 523 derives a result of analysis, and the process proceeds to the step S1011. A result of analysis is calculation of the concentration of the analyte in the sample or evaluation of the sample based on the calculated concentration. In the step S1011, the outputter 44 outputs the result of analysis, and a series of processes ends.

Following modifications is in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

In the above-mentioned adjustment example 2, an adjustment threshold value is generated by adjustment of an evaluation threshold value based on adjustment information, and a sample is evaluated with use of the adjustment threshold value. However, a sample may be evaluated by comparison between a concentration of a sample obtained based on an adjustment calibration curve and an evaluation threshold value.

Modified Example 2

A program for implementing an information processing function of the analysis device 1 may be recorded in a computer-readable recording medium. A computer system may read the program, which is recorded in the recording medium, in regard to the control of a process to be executed by the above-mentioned data processor 52 and its related processes and execute the program. A "computer system" here includes hardware such as an OS (Operating System) or peripheral appliances. Further, a "computer-readable recording medium" refers to a movable recording medium such as a flexible disc, an optical magnetic disc, an optical disc or a memory card and a storage device such as a hard disc built into the computer system. Further, a "computer-readable recording medium" may include an object that retains a program movably for a short period of time such as a communication wire that is used when a program is transmitted through a network such as the Internet or a communication line such as a telephone line, or an object that retains a program for a certain period of time such as a volatile memory in a computer system that serves as a server or a client. Further, the above-mentioned program may be to implement part of the above-mentioned functions and may further be to implement the above-mentioned functions by being combined with a program that has already been recorded in the computer system.

Further, in a case where being applied to a personal computer (hereinafter referred to as a PC), the program relating to the above-mentioned control can be provided via a recording medium such as a CD-ROM or a DVD-ROM, or a data signal such as the Internet. FIG. 8 is a conceptual diagram showing the appearance. A PC 950 receives a program via a CD-ROM 953. Further, the PC 950 has a function to be connected to a communication line 951. The computer 952 is a server computer that provides the above-mentioned program and stores the program in a recording medium such as a hard disc. The communication line 951 is a communication line such as the Internet or a personal computer communication, or a dedicated communication line. The computer 952 reads a program with the use of a hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

Aspects

It is understood by those skilled in the art that the plurality of above-mentioned embodiments are specific examples of the below-mentioned aspects.

(Item 1) An analysis method according to one aspect of performing an analysis on a sample containing a first substance and a second substance that has an influence on an analysis of the first substance in regard to a concentration of the first substance, includes performing an analysis on the sample in regard to the concentration of the first substance to obtain sample analysis data, and deriving a result of analysis in regard to a concentration of the first substance based on the sample analysis data and adjustment information that is set based on the influence. Thus, even in a case in which a sample including a substance that influences an analysis of a contained analyte, the concentration or mass of the analyte contained in a sample to be analyzed can be accurately analyzed.

(Item 2) The analysis method according to another aspect which is the analysis method of the aspect according to item 1, wherein the adjustment information is set based on standard analysis data of a standard sample, which contains the first substance at a known concentration and contains the second substance, and reference analysis data of a reference sample, which contains the first substance at the known concentration and does not contain the second substance. Thus, the influence of an analyte on an analysis can be rationally obtained.

(Item 3) The analysis method according to another aspect which is the analysis method of the aspect according to item 2, wherein the sample analysis data and the reference analysis data are an analysis peak and a reference peak, respectively, corresponding to the first substance, and the adjustment information is set based on a relationship between magnitude of the analysis peak and magnitude of the reference peak. Thus, the influence of an analyte on an analysis can be efficiently obtained.

(Item 4) The analysis method according to another aspect which is the analysis method of the aspect according to item 3 is of setting an analysis peak threshold value which is a threshold value of an analysis peak based on the adjustment information, and evaluating a concentration of the first substance in the sample based on comparison between the analysis peak threshold value and the analysis peak. Thus, a sample can be accurately evaluated based on a concentration of an analyte.

(Item 5) The analysis method according to another aspect which is the analysis method of the aspect according to item 3 is of generating a reference calibration curve in regard to the first substance based on the reference peak, applying the sample analysis data to the reference calibration curve to obtain an analysis concentration of the first substance in the sample, setting a concentration threshold value for evaluation in regard to a concentration of the first substance in the sample based on the analysis concentration and the adjustment information, and performing the evaluation based on comparison between the concentration threshold value and the analysis concentration. Thus, a sample can be accurately evaluated based on a concentration of an analyte.

(Item 6) The analysis method according to another aspect which is the analysis method of the aspect according to item 5, wherein the reference calibration curve is generated based on a plurality of the reference peaks corresponding to the first substance obtained by an analysis in regard to a plurality of the reference samples having the first substance at different concentrations. Thus, a sample can be evaluated more accurately based on a concentration of an analyte.

(Item 7) The analysis method according to another aspect which is the analysis method of the aspect according to item 5 or 6 is of adjusting the reference calibration curve based on the adjustment information to generate an adjustment calibration curve, and applying the sample analysis data to the adjustment calibration curve to obtain an analysis concentration of the first substance in the sample. Thus, a sample can be evaluated more accurately based on a concentration of an analyte.

(Item 8) The analysis method according to another aspect is the analysis method according to any one of items 1 to 7, wherein the first substance is a bromine compound, and the second substance is a chlorine compound. Thus, the concentration or mass of a bromine compound in a sample containing a bromine compound and a chlorine compound can be analyzed more accurately.

(Item 9) The analysis method according to another aspect which is the analysis method of the aspect according to item 8, wherein the first substance is any one type or a plurality of any types out of polybrominated diphenyl ethers, polybrominated biphenyls, and bromine flame retardants and additives including other bromines, and the second substance is resin including polyvinyl chloride (PVC) and other chrlorides. Thus, it is possible to more accurately analyze the concentration or mass of polybrominated diphenyl ethers, polybrominated biphenyls, and bromine flame retardants and additives including other bromines, and polyvinyl chloride (PVC) and other chrlorides.

(Item 10) The analysis method according to another aspect which is the analysis method of the aspect according to item 9, wherein the bromine flame retardants and additives including other bromines are tetrabromobisphenol A and/or hexabromocyclododecane. Thus, it is possible to more accurately analyze the concentration or mass of the brominated flame retardant or the additive, described above, in a sample containing a compound including resin including tetrabromobisphenol A and/or hexabromocyclododecane and/or other chrlorides.

(Item 11) The analysis method according to another aspect which is the analysis method of the aspect according to any one of items 1 to 10, wherein the analysis is performed by gas chromatography, liquid chromatography, mass spectrometry, gas chromatography/mass spectrometry or liquid chromatography/mass spectrometry. Thus, the concentration or mass of an analyte contained in a sample to be analyzed can be accurately analyzed.

(Item 12) An analysis device according to one aspect that performs an analysis on a sample containing a first substance and a second substance that has an influence on an analysis of the first substance in regard to a concentration of the first substance, includes a processing apparatus that derives a result of analysis in regard to a concentration of the first substance based on sample analysis data obtained by an analysis on the sample in regard to a concentration of the first substance and adjustment information that is set based on the influence. Thus, the concentration or mass of an analyte contained in a sample to be analyzed can be accurately analyzed.

(Item 13) The analysis device according to another aspect is the analysis method of the aspect according to item 12, further includes substance information in which at least one of the first substance and the second substance is set, wherein the adjustment information is generated based on the substance information. Thus, the concentration or mass of an analyte contained in a sample to be analyzed can be accurately and efficiently analyzed.

(Item 14) The analysis device according to another aspect which is the analysis device of the aspect according to item 13, further includes a display device that displays connection between the first substance and the second substance based on the substance information. Thus, the operator can easily recognize the relationship between a first substance and a second substance contained in the sample.

(Item 15) A non-transitory computer readable medium according to one aspect is a non-transitory computer readable medium storing a program causing an analysis device to execute an analysis process on a sample containing a first substance and a second substance that has an influence on an analysis of the first substance in regard to a concentration of the first substance, and the program derives a result of analysis in regard to the concentration of the first substance based on sample analysis data which is obtained by an analysis on the sample in regard to the concentration of the first substance and adjustment information that is set based on the influence, in the analysis process. Thus, the analysis device can accurately analyze the concentration or mass of an analyte contained in a sample to be analyzed.

The present invention is not limited to the contents of the above-mentioned embodiment. Other aspects are possible without departing from the spirit and scope of the present invention.

REFERENCE SIGNS LIST

1 . . . Analysis device, 10 . . . Pyrolysis gas chromatograph, 14 . . . Separation column, 20 . . . Pyrolysis apparatus, 30 . . . Mass Spectrometry Unit, 33 . . . Ionizer, 35 . . . Mass separator, 36 . . . Detector, 40 . . . Information processor, 44 . . . Outputter, 50 . . . Controller, 52 . . . Data processor, 100 . . . Measurer, 521 . . . Intensity Calculator, 522 . . . Information Generator, 523 . . . Determiner, 530 . . . Notifier, In . . . Ions

The invention claimed is:

1. An analysis method of performing an analysis on a sample containing a first substance and a second substance that has an influence on the analysis of the first substance, comprising:

setting adjustment information based on a relationship between an area of a standard sample peak and an area of a reference sample peak, the standard sample peak is a mass analysis peak of a standard sample that contains the first substance at a known concentration and contains the second substance, and the reference sample peak is a mass analysis peak of a reference sample that contains the first substance at the known concentration and does not contain the second substance, setting an analysis peak threshold value based on the adjustment information, performing mass analysis on the sample to obtain sample analysis data including an area of a sample analysis peak; and determining a concentration of the first substance in the sample based on a comparison between the analysis peak threshold value and the area of the sample analysis peak, wherein the mass analysis is performed by a Pyrolysis Gas Chromatograph-Mass Spectrometer.

2. The analysis method according to claim 1, wherein the first substance is a bromine compound, and the second substance is a chlorine compound.

3. The analysis method according to claim 2, wherein the first substance is any one type or a plurality of any types out of polybrominated diphenyl ethers, polybrominated biphenyls, and bromine flame retardants and additives including bromines, and the second substance is resin including polyvinyl chloride (PVC) and chlorides.

4. The analysis method according to claim 3, wherein the first substance is the bromine flame retardants and additives including bromines, and the bromine flame retardants and additives including bromines are tetrabromobisphenol A and/or hexabromocyclododecane.

5. An analysis method of performing an analysis on a sample containing a first substance and a second substance that has an influence on an analysis of the first substance, comprising:

setting adjustment information based on a relationship between an area of a standard sample peak and an area of a first reference sample peak, the standard sample peak is a mass analysis peak of a standard sample that contains the first substance at a known concentration and contains the second substance, and the first reference sample peak is a mass analysis peak of a first reference sample that contains the first substance at the known concentration and does not contain the second substance, generating a reference calibration curve in regard to the first substance based on a relationship between the area of the first reference sample peak and an area of a second reference sample peak, the second reference sample peak is a mass analysis peak of a second reference sample that contains the first substance at a different concentration than the first reference sample and does not contain the second substance, generating an adjustment calibration curve by adjusting the reference calibration curve based on the adjustment information;

performing mass analysis on the sample to obtain sample analysis data including an area of a sample analysis peak; and determining a concentration of the first substance in the sample by applying the area of the sample analysis peak to the adjustment calibration curve, and wherein the mass analysis is performed by a Pyrolysis Gas Chromatograph-Mass Spectrometer.

6. The analysis method according to claim 5, wherein the first substance is a bromine compound, and the second substance is a chlorine compound.

7. The analysis method according to claim 6, wherein the first substance is any one type or a plurality of any types out of polybrominated diphenyl ethers, polybrominated biphenyls, and bromine flame retardants and additives including bromines, and the second substance is resin including polyvinyl chloride (PVC) and chlorides.

8. The analysis method according to claim 7, wherein the bromine flame retardants and additives including bromines are tetrabromobisphenol A and/or hexabromocyclododecane.

9. An analysis device that performs an analysis on a sample containing a first substance and a second substance that has an influence on an analysis of the first substance, comprising a processing apparatus that is configured to:

set adjustment information based on a relationship between an area of a standard sample peak and an area of a reference sample peak, the standard sample peak is a mass analysis peak of a standard sample that contains the first substance at a known concentration and contains the second substance, and the reference sample peak is a mass analysis peak of a reference sample that contains the first substance at the known concentration and does not contain the second substance, set an analysis peak threshold value based on the adjustment information, and determine a concentration of the first substance in the sample based on comparison between the analysis peak threshold value and an area of a sample analysis peak, the sample analysis peak provided by performing mass analysis on the sample; wherein the mass analysis is performed by a Pyrolysis Gas Chromatograph-Mass Spectrometer.

10. The analysis device according to claim 9, wherein the processing apparatus is further configured to set substance information for at least one of the first substance and the second substance, wherein the adjustment information is generated based on the substance information.

11. The analysis device according to claim 10, further comprising a display device that displays a connection between the first substance and the second substance based on the substance information.

12. An analysis device that performs an analysis on a sample containing a first substance and a second substance that has an influence on an analysis of the first substance, comprising a processing apparatus configured to:

set adjustment information based on a relationship between an area of a standard sample peak and an area of a first reference sample peak, the standard sample peak is a mass analysis peak of a standard sample, which contains the first substance at a known concentration and contains the second substance, and the first reference sample peak is a mass analysis peak of a reference sample, which contains the first substance at the known concentration and does not contain the second substance, generate a reference calibration curve in regard to the first substance based on a relationship between the area of the first reference sample peak and an area of a second reference sample peak, the second reference sample peak is a mass analysis peak of a second reference sample that contains the first substance at a different concentration than the first reference sample and does not contain the second substance, generate an adjustment calibration curve by adjusting the reference calibration curve based on the adjustment information; and determine a concentration of the first substance in the sample by applying the area of the sample analysis peak to the adjustment calibration curve, the sample analysis peak provided by performing mass analysis on the sample, wherein the mass analysis is performed by a Pyrolysis Gas Chromatograph-Mass Spectrometer.

13. The analysis device according to claim 12, wherein the processing apparatus is further configured to set substance information for at least one of the first substance and the second substance, wherein the adjustment information is generated based on the substance information.

14. The analysis device according to claim 13, further comprising a display device that displays a connection between the first substance and the second substance based on the substance information.

\* \* \* \* \*